(12) United States Patent
Fanucci et al.

(10) Patent No.: US 6,730,382 B2
(45) Date of Patent: May 4, 2004

(54) STIFF COMPOSITE STRUCTURES

(75) Inventors: Jerome P. Fanucci, Lexington, MA (US); James J. Gorman, Boxborough, MA (US); Thomas D. Heimann, Bedford, MA (US)

(73) Assignee: Kazak Composites, Incorporated, Woburn, MA (US)

( * ) Notice: Subject to any disclaimer, the term of this patent is extended or adjusted under 35 U.S.C. 154(b) by 0 days.

(21) Appl. No.: 10/039,902

(22) Filed: Oct. 23, 2001

(65) Prior Publication Data
US 2002/0106469 A1 Aug. 8, 2002

Related U.S. Application Data
(60) Provisional application No. 60/242,522, filed on Oct. 23, 2000.

(51) Int. Cl.[7] .................................................. B32B 1/08
(52) U.S. Cl. ...................... 428/36.9; 428/34.1; 428/35.7
(58) Field of Search ................................ 428/34.1, 35.7, 428/36.9

(56) References Cited

U.S. PATENT DOCUMENTS
4,161,131 A * 7/1979 Blayman .................... 84/453

* cited by examiner

*Primary Examiner*—Sandra M. Nolan
(74) *Attorney, Agent, or Firm*—Weingarten, Schurgin, Gagnebin & Lebovici LLP

(57) ABSTRACT

A damage-resistant structure suitable for ship's stanchions and other tube and post applications that are susceptible to permanent bending deformation from impacts or overloads is revealed. Multiple stiff, strong, axially oriented high aspect ratio reinforcements, in the form of fibers and/or prefabricated composite or metal parts, are arranged parallel to the main axis of the structural tube. A high strain-to-failure matrix material positions, supports and, in some cases, also encapsulates the prefabricated axial reinforcing materials. The axial reinforcements provide the required strength and stiffness properties of the overall structure, while the more resilient unreinforced or lightly reinforced high strain matrix of the global structure provides the assembly with the ability to undergo large elastic buckling.

31 Claims, 2 Drawing Sheets

STIFF COMPOSITE STRUCTURES

CROSS REFERENCE TO RELATED APPLICATIONS

This application claims the benefit under 35 U.S.C. §119(e) of U.S. Provisional Application No. 60/242,522 Oct. 23, 2000 the entire disclosure of which is incorporated herein by reference herein.

STATEMENT REGARDING FEDERALLY SPONSORED RESEARCH OR DEVELOPMENT

This invention was made in part with United States Government Support under Contract Number N00167-99-C-0041, SBIR Topic #N99-096 awarded by the Department of the Navy. Therefore, the U.S. Government has certain rights in the invention.

BACKGROUND OF THE INVENTION

Metal stanchions serve as the vertical structural posts of many shipboard safety railing systems. Stanchion-supported horizontal cables provide a ship's crew with safety barriers along deck edges, platforms, and aircraft carrier elevators. One typical shipboard safety stanchion system consists of four primary parts, an approximately 38-inch long vertical hollow post with a 3.5-inch OD and 0.25-inch thick walls (the stanchion), a lower metal insert to facilitate mounting the post to the ship's deck, an upper metal insert for interfacing the post with a post-cap, and a metal post-cap containing a through-hole to locate the horizontal cables that form the actual safety barrier.

Even though metal stanchions are widely used and accepted, the current steel design has several serious shortcomings. Considerable maintenance is required to prevent corrosion of the steel. In addition, the metal posts significantly contribute to a ship's radar cross section, and are a source of electromagnetic interference when positioned near transmitting and receiving systems. The current steel stanchions can be permanently bent when bumped by aircraft carrier deck equipment.

Some stanchions used on aircraft carriers are designed to move, recessing into the deck when the ship's aircraft elevator is up, and rising to provide a safety railing when the elevator is down. A permanently bent moving stanchion on a carrier is a critical problem, causing the ship's elevator to become inoperable until the stanchion can be straightened or replaced. Even for non-moving stanchions, a bent stanchion represents a maintenance issue. An improved stanchion system, or more generically, any type of structural post that returns approximately to its undeformed position after a moderate impact, is highly desirable for use on aircraft carriers as well as general surface vessels. Any structural post or pole subjected to bending caused by operational overload or impact, such as sign posts, street lights poles, utility poles, flag poles, antennas and parking meters, would benefit from a capability to undergo large bending deformation followed by elastic recovery to the approximately original orientation.

The use of composite materials to replace steel in stanchions surrounding carrier elevators has been previously investigated. Stanchions made with traditional composite matrix materials such as polyester, vinyl ester and epoxy do reduce maintenance requirements associated with corrosion, and also reduce radar cross section and electrical interference issues. However, these materials result in stanchions that undergo a brittle failure, and therefore are too susceptible to catastrophic failure during frequent encounters with deck equipment. Matrix materials with higher strain to failure permit more damage tolerant stanchions to be constructed.

In previous experiments, a filament wound glass fiber reinforced polyurethane matrix composite stanchion was constructed by the Navy. The Navy's experimental filament wound composite stanchion eliminates corrosion, reduces radar cross section, reduces the electrical interference issues associated with metal stanchions, and is suitably resistant to chemical and UV degradation. The experimental filament wound composite stanchion is less susceptible to damage that can incapacitate an aircraft carrier elevator system than prior metallic or composite stanchions. However, its elastic recovery after repeated impacts of the Navy experiment was less than ultimately desired. Cost of the filament wound system was also high. An improved stanchion design with much greater ability to elastically return from a bent position, and significantly reduced cost, is highly desirable.

SUMMARY OF THE INVENTION

A tubular stanchion or post providing a specified initial transverse load Capacity at a small deflection, coupled with the ability to recover its initial shape elastically when excessive accidental or impact loads are applied, is desirable in many military and commercial shipboard as well as other infrastructure applications. Additional stanchion attributes such as corrosion and UV exposure resistance as well as low electromagnetic cross-section would further improve the desirability of such stanchion configurations. The invention described herein provides all of these desirable functional characteristics through a composite material architecture. This architecture comprises a plurality of pre-pultruded unidirectional stiffeners oriented in the stanchion longitudinal direction and distributed uniformly about its circumference. The unidirectional pultruded stiffeners are sandwiched or encapsulated by inner and outer layers of a discontinuous and randomly oriented fibrous mat that provides both positioning of the pultruded stiffeners and a tailoring of the stanchion circumferential rigidity. Both the inner and outer reinforcing fibrous mat layers and the interstitial space between the unidirectional pultruded stiffeners are substantially filled with a highly resilient resin matrix. The principal result of this unique construction is that a tailored high longitudinal bending rigidity is coupled with a low circumferential rigidity.

The distinct elements of this basic construction may be varied to provide a pre-determined transverse load capacity at very small deflection, followed by a flattening of the critical cross section location and elastic bending to very large deflections when the preset threshold level is exceeded. The combination of highly resilient resin matrix and light random/discontinuous fibrous mat reinforcement causes the flattened/deformed stanchion to return elastically to its original configuration when the excessive load is removed.

Suitable arrangement of the composite architecture details allows a stanchion so constructed to experience the low deflection threshold and large deflection response many times without exhibiting damage or loss of initial load capacity. The composite architecture included in this invention may be fabricated from a variety of types and proportions of constituent materials in numerous permutations suited to specific applications. Furthermore, the invention may be produced by any of several composite manufacturing processes, including pultrusion, resin infusion methods with hard or soft tooling, and manual lay-up procedures. For some applications it may be desirable to minimize or eliminate the fibrous mat reinforcement comprising the inner and outer surface layers of the composite stanchion, leaving the unidirectional pultruded stiffeners encapsulated by a neat or nearly neat resin matrix filling the spaces between the stiffener surfaces and the inner and outer diameters of the stanchion. Other aspects, features and advantages of the present invention are disclosed in the detailed description that follows.

BRIEF DESCRIPTION OF THE SEVERAL VIEWS OF THE DRAWING

The invention will be understood from the following detailed description in conjunction with the drawings, of which.

DETAILED DESCRIPTION OF THE INVENTION

Figure 1A:
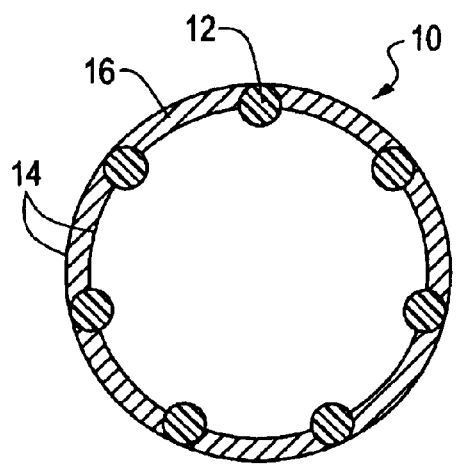
FIG. 1A is a cross section of a stanchion according to the invention.

Primary mechanical requirements for a highly damage tolerant stanchion include a stiffness requirement and a post-impact deformation recovery requirement. The stiffness requirement verifies the ability of the stanchion to act as a support for safety lines around carrier elevators and the ship edges. One typical stanchion system requirement is for the stanchion to respond to a horizontal tip load of 300 pounds with only a small amount of bending This bending deflection must be sufficiently small that the safety lines feel "safe" when leaned on by a crew member.

One typical recovery requirement is for the stanchion to be able to bend 25 times to a large deformation from vertical (30°–45° for example) and follow that deformation with an essentially-elastic recovery to approximately the initial vertical position once the load is removed. The ability to bend multiple times to a large angle and then return to the approximately original vertical position verifies that the stanchion can withstand the impact of deck equipment. The elastic recovery is important to ensure that a bent stanchion does not interfere with the operation of the deck elevators on an aircraft carrier, and that minimal maintenance is required to repair stanchions and posts used in other applications where frequent impacts can be expected.

In considering advancing of the current state of the art of composite stanchions, the traditional layup of composite reinforcing fibers, such as the off-axis wound fiber patterns typical of previous attempts to develop suitable filament wound stanchions, were rejected because experiments and analysis showed that some of the off-axis fibers fail as a result of hoop stresses while bending the post to large deflection angles making full elastic recovery problematical, particularly after repeated impacts.

The composite stanchion described herein eliminates most structurally-critical low strain-to-failure off-axis fibers in regions of maximum bending deformation. Some off-axis fiber can be used to reinforce the hoop direction of the base and tip without significantly altering the critical global behavior of the invention. The stanchion is formed with its structurally-important reinforcing materials oriented essentially parallel to the axis of the stanchion, while the majority of material between the axial reinforcements, providing the structure with its hoop integrity, is a high strain-to-failure matrix material with light structural fiber reinforcement of a discontinuous and randomly oriented felt-like type.

The described improvements to deformable stanchion or post technology are based on the demonstrated use of multiple axially-oriented, conventional, pre-pultruded small diameter glass fiber unidirectional rods as the primary axial structural material, encapsulated in a tube formed primarily with a highly resilient (strain-to-failure greater than 20%) resin matrix. Axially-oriented, high aspect ratio reinforcing shapes composed of other composite or metal materials encapsulated in a high strain matrix would perform similarly. In this type of post, the number and size of axial rods are chosen to provide the desired bending stiffness and strength, while the matrix material is selected to withstand the high local hoop strains associated with cross sectional buckling at high deformations.

Figure 1B:
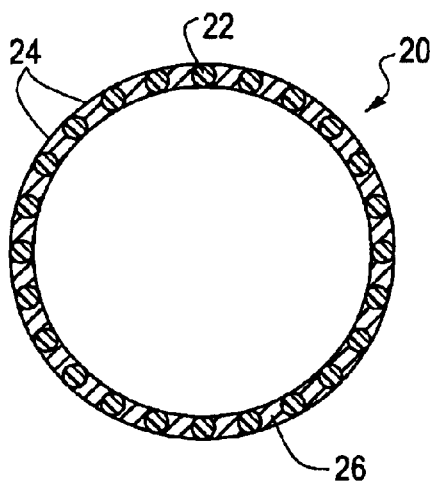
FIG. 1B is a cross section of an alternate stanchion according to the invention.

FIGS. 1A and 1B show two alternate stanchion cross-section implementations based on the pre-pultruded rod design. FIG. 1A shows a smaller number of larger diameter pre-pultruded rods 12, arranged in a circle with resin matrix 16 between the rods. Layers of a lightweight discontinuous and randomly oriented fibrous mat disposed on the inner and outer surfaces of the stanchion 14 may optionally be used to hold the rods in the circular shape and distribute matrix material during fabrication, as well as provide circumferential stiffness tailoring. FIG. 1B shows a large number of smaller diameter rods 22, optionally held in a circle by the lightweight discontinuous and randomly oriented fibrous mat layers 24, with matrix resin 26 between the rods 22. The selection between these and similar implementations is based on performance for the size and loads being implemented, and cost. The implementation of FIG. 1B is found to be more suited to the aircraft carrier elevator stanchion application.

In this design, the individual small diameter pultruded rods 22, are held at a fixed spacing around the circumference of and through the thickness of a wall of a larger diameter stanchion tube by the matrix 26 and fibrous mat layers 24, resulting in a structure with a bending stiffness (EI), large enough to replace a steel stanchion tube for the safety application, yet flexible enough to buckle approximately elastically at the larger load associated with impact by deck equipment. In the aircraft carrier elevator implementation, a stanchion with an approximately 3.5 inch outer diameter circular cross-section (matching the current steel stanchion geometry for ease of retrofit) meets the 300-pound tip load/small deflection requirement.

Each individual pre-pultruded rod 22 in stanchion 20 can be bent around a small radius when not constrained by the global stanchion structure. The matrix between the rods is sufficiently flexible that the stanchion is able to bend globally and locally under the impact of a piece of deck equipment, even changing considerably from the original circular cross section under loads that exceed the small deflection requirement by locally buckling to a nearly flat shape, and then springing back to the original, approximately undeformed straight tubular global stanchion shape. Pre-pultruded E-glass/epoxy rods 22 surrounded and encapsulated by a tube consisting primarily of a high elongation polyurethane resin represents one combination of materials that allow the desired impact deformations and allow the stanchion 20 to elastically return to its original vertical position with the matrix remaining intact.

In one implementation, a randomly oriented felt 24 (commonly used as breather material in vacuum bag operations) is used to hold the prepultruded E-glass/epoxy rods 22 in position between an inner and outer surface of the stanchion 20 during manufacture, to help distribute resin during manufacture, and to provide a resin rich surface for the finished stanchion. These optional surfacing materials, which can be polyester, glass mat, felt, approximately axially-braided glass layers, or other materials that do not excessively stiffen the structure in the hoop direction between the reinforcing rods, help to position the rods 22 transversely and provide a protective barrier between the manufacturing surfaces and the structural rods 22 to mitigate operational damage.

In a preferred aspect, the rods 22 use E-glass (glass manufactured at 1550° C.) as a reinforcing material in the composite stanchion 20. E-glass has good stiffness and strength, has a relatively high strain-to-failure and is low in cost. E-glass also handles well in the pultrusion process, which is an economical way to make both the rods 22 and the stanchions 20 in volume.

Carbon fiber can alternatively be utilized to reinforce rods 22, but it is more expensive and is about three times stiffer than E-glass. The stiffness is not an advantage that offsets the higher material cost in this particular carrier application. Carbon fiber only has half the strain-to-failure of glass, making it more difficult to implement the recovery requirement. Other stanchion reinforcement material alternatives for the rods include aramid fibers, carbon fibers of various types, liquid crystal polymer fibers of several types, nylon, stranded metals, solid metals, extruded plastic and various natural fibers. Each of these alternatives has at least one significant cost, weight, stiffness, strength or maximum strain disadvantage when compared to E-glass for the aircraft carrier application, but may be more advantageous in other applications with different design parameters.

The resin incorporated in the composite rods 22 must allow the rods 22 to freely bend and return to the original straight position. In the invention described herein, the rods undergo only moderate axial strain when the stanchion is highly deformed. Most large local deformations occur in the hoop direction, which is generally lightly reinforced by the fibrous mat layers 24. Therefore, rod matrix and reinforcing materials need only have moderate strain-to-failure. Experiment and analysis showed that reinforcing composite rod requirements could be met by many commercially available polyester, vinyl ester, epoxy and other thermosetting and thermoplastic matrix systems, including those used commonly in the pultrusion process. In one successful stanchion demonstration, a commercial epoxy resin, a Shell 9400-series epoxy, was used with success as a matrix system for E-glass fiber reinforced pultruded rods.

In addition to the multiple reinforcing axial rods, the stanchion requires a material 26 to form the remainder of its tubular body. Resin used to form the stanchion body supports, and possibly surrounds and encapsulates, the multiple pre-pultruded composite rods 22 (which can be made with the same or different matrix material). This stanchion tube body material 26 must have sufficiently high strain-to-failure to allow large elastic hoop-direction matrix deformations associated with impact and local buckling between the much stiffer axial composite rods 22 when the stanchion 20 is highly bent. Furthermore, the effective circumferential stiffness of the stanchion 20 must be tailored to provide the desired threshold load capacity at which the large deflection behavior takes over from the stiff/small-deflection behavior. Numerous experiments were conducted to identify a suitable resin system for the stanchion tube body that meets the strength, stiffness and high strain-to-failure requirements for this application.

The resin 26 for the stanchion tube 20 must be of an appropriate matrix material with the required combination of low cost, high strength, and high strain-to-failure. It is also desirable but not necessary that the material be pultrudable to minimize cost by production automation. Three different base systems, each with multiple formulations of polyurethane resin, were utilized in prototype applications. These base systems include, a Uniroyal Adiprene system, a specific polyurethane resin type, and a blend of materials chosen to optimize matrix material properties and pultrudability.

Adiprene polyurethanes such as Adiprene L100 prepolymer in combination with a urethane curative like Caytur 21 were used. Other similarly resilient matrix systems will serve the purpose. L100 is a toluene diisocyanate-based polyether prepolymer that cures with the Caytur 21 blocked methylene dianiline at 100° C. to produce a unreinforced "vulcanizate" with Shore A hardness of 90 (43D) and a 100% modulus of 1,100 psi. The Caytur 21 urethane curative is a conventional polyurethane formulation in which a prepolymer is reacted with a stoichiometric (or 3 to 5% excess) amount of an aromatic diamine curative to form a phase separated polyurethane elastomer. Precise formulation of the resin and cure to achieve high molecular weight and optimum mechanical properties is within the abilities of those experienced in the art.

Stanchion fabrication was demonstrated on pre-prototype applications using two processes, a pultrusion process and a conventional lay-up process. Resin transfer molding, filament winding, extrusion, press molding, vacuum assisted resin transfer molding, and a variety of other manufacturing processes familiar to those skilled in the art of composite materials production could be equally adapted to the fabrication of stanchions, tubes and other constructions of the type revealed by this invention. The automated pultrusion process can be viewed as a number of sub-processes, including reinforcement preforming, resin wet out (impregnation) and molding/curing. Use of pre-pultruded rods simplifies positioning of the reinforcing materials considerably compared to traditional ways of forming the reinforcements coincident with forming the overall stanchion geometry. When preforming of the structural rods is done off line in a preparatory process prior to fabrication of the stanchion, the rod production step has no direct impact on the urethane pultrusion process for the reinforced stanchion tube.

The impregnation method for the stanchion tube is highly dependent on the details of the resin being used. There are resins that cure in a few minutes, resins that have longer pot lives and UV-activated resins, to cite a few. Pultrusion systems must be adapted to accommodate the selected resin.

Stanchions were made with 72 pre-pultruded 0.1135-inch diameter unidirectional E-glass/epoxy rods, formed into a single close-packed layer around the circumference of a tube. The rods had approximately 65% fiber volume and an approximate axial modulus of ~6 MSI. They were arranged axially running from end to end of the stanchion. The rods were sandwiched between two layers of polyester felt that had a finished thickness of approximately 0.060 inches each. Total finished thickness of the stanchion walls was approximately 0.25 inches.

Another method of making stanchions involves the Resin Transfer Molding (RTM)-like infusion and cure system as is known in the industry. Tube fabrication begins by placing a selected random fibrous mat on the inner surface of a regular array of unidirectional pultruded stiffeners. The assembly of such a concentric tubular preform may be accomplished by using a tooling element such as a mandrel that would fix the inner diameter of the finished stanchion. This fibrous mat material helps reinforce the rod transversely and provides a protective barrier between the surfaces and the structural rods to mitigate operational damage. The array in this particular application is 72 small diameter pultruded glass/epoxy rods oriented along the axis of the preform. These are temporarily held in place while an outer layer of fibrous mat material is applied and the stanchion components plus core mandrel is loaded into a hard female tooling element defining the outer surface of the particular product. Wet out and cure is initiated using standard RTM technology. Replacing the resin transfer step with a similar process that uses materials pre-impregnated with the wet matrix material creates an equally functional stanchion structure. Another possible fabrication method retains the hard inner mandrel tooling element and substitutes soft outer tooling consistent with vacuum-bagging or other single-sided tooling infusion techniques.

Figure 2:
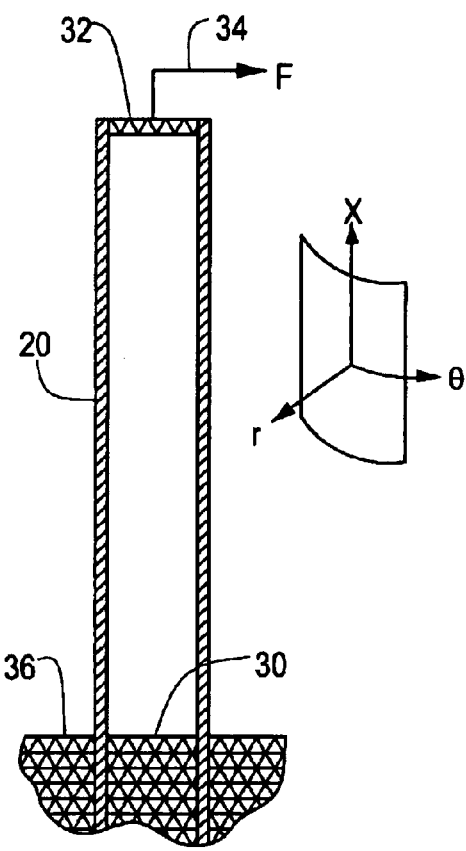
FIG. 2 is an illustration of a stanchion according to the invention as utilized on a ship.

The stanchions are used in the configuration of FIG. 2, where stanchion 20 has a steel plug 30 at the base that fits into steel fitting 36. A steel cap 32 fills a top opening. Typically, force F is exerted through safety lines (not shown) that fit into the steel cap.

Figure 3:
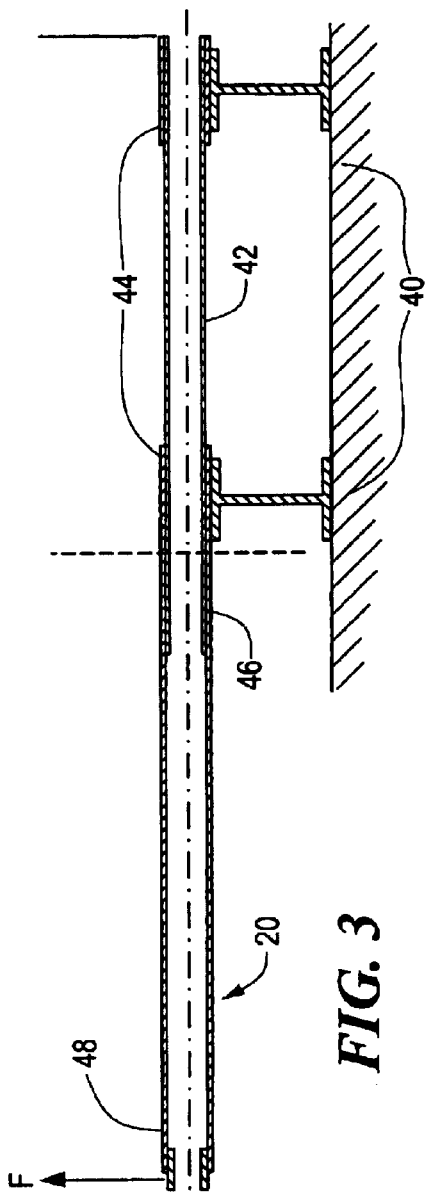
FIG. 3 is an illustration of a test setup utilized for embodiments of the invention.

A test fixture shown in FIG. 3 was used to test the prototype stanchions formed according to this invention. The he stanchion under test was held horizontally by one end by a pipe 42 held in a rigid mount 40. Supports 44 assured that the supporting end 46 was held steady. A force "F" was applied to the outboard end 48 of the stanchion 20.

Figure 4:
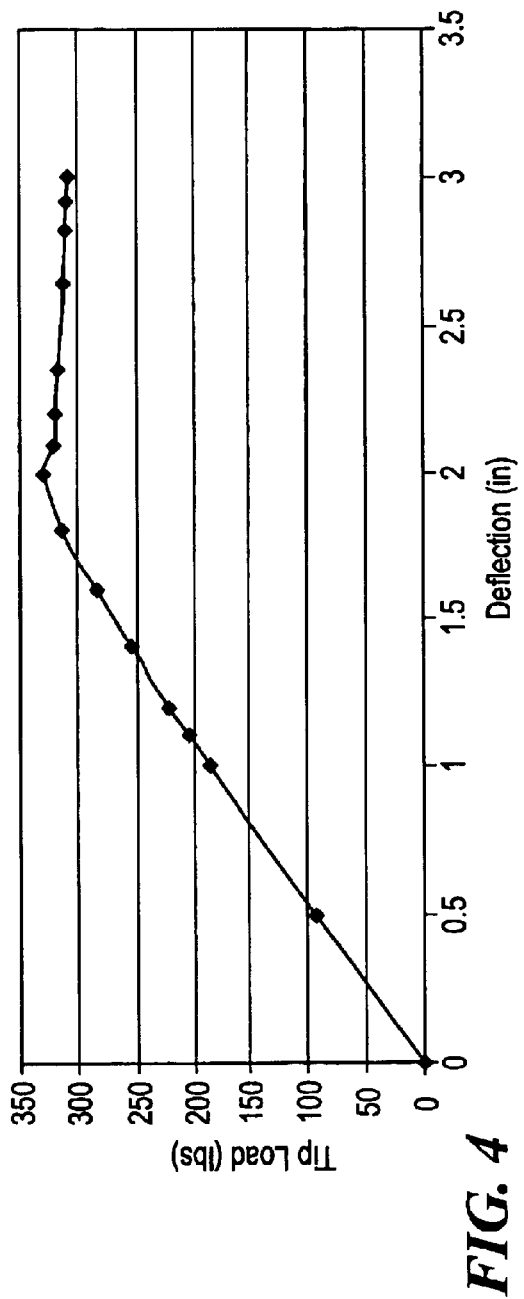
FIG. 4 is a graph of force vs deflection of an embodiment of the invention.

FIG. 4 shows a typical result of the tests. Here, the tip 48 deflects no more than 1.5 inches in reaction to force F (the Tip Load) until the force exceeds 300 pounds. At that point, the tube buckles locally, forming a hinge that results in additional deflection with only a small change in applied load. The stanchion deflects repeatedly up to 45° with no permanent harm and returns upright when the tip load F is removed.

Having described preferred embodiments of the invention it will now become apparent to those of ordinary skill in the art that other embodiments incorporating these concepts may be used. Accordingly, it is submitted-chat the invention should not be limited by the described embodiments but rather should only be limited by the spirit and scope of the appended claims.

What is claimed is:

1. A composite tubular structure comprising:
   a plurality of elongated reinforcing stiffeners disposed in generally elongated alignment with each other and arranged at locations around a periphery; and
   a resilient resin matrix distributed around the periphery in regions between each of the stiffeners for the length of the stiffeners, the matrix supporting and retaining the stiffeners at their respective locations around the periphery;
   wherein the stiffeners and the matrix therebetween form a hollow tube, the stiffeners providing more axial reinforcement to the tube than the matrix provides, the matrix providing more hoop strength to the tube than the stiffeners provide.

2. The structure of claim 1, further comprising an inner layer of the hollow tube comprising a fibrous mat.

3. The structure of claim 2, wherein the fibrous mat comprises discontinuous and randomly oriented fibers.

4. The structure of claim 2, wherein the fibrous mat includes natural or synthetic fibers.

5. The structure of claim 2, wherein the fibrous mat has a density up to approximately 50 ounces per square yard.

6. The structure of claim 1, further comprising an outer layer of the hollow tube comprising a fibrous mat.

7. The structure of claim 6, wherein the fibrous mat comprises discontinuous and randomly oriented fibers.

8. The structure of claim 6, wherein the fibrous mat includes natural or synthetic fibers.

9. The structure of claim 6, wherein the fibrous mat has a density up to approximately 50 ounces per square yard.

10. The structure of claim 1, further comprising an inner layer of the hollow tube and an outer layer of the hollow tube, the inner and outer layers each comprising a mat of fibrous material, additional fibrous material disposed at locations subject to higher stress.

11. The structure of claim 1, wherein the resilient matrix has a ratio of strain to failure greater than 20%.

12. The structure of claim 1, wherein the resilient matrix comprises a polyurethane resin.

13. The structure of claim 12, wherein the polyurethane resin comprises a toluene diisocyanate-based polyether prepolymer cured with a urethane curative.

14. The structure of claim 13, wherein the curative comprises an aromatic diamine curative.

15. The structure of claim 1, wherein the resilient resin matrix comprises a polyurethane resin, a vinyl ester, or a silicone rubber.

16. The structure of claim 1, wherein the stiffeners include a fibrous reinforcing material, the fibrous reinforcing material comprising glass fibers, carbon fibers, aramid fibers, liquid crystal polymer fibers, natural fibers, stranded metallic fibers, homogeneous metallic fibers, or polymeric fibers.

17. The structure of claim 1, wherein the stiffeners include a glass fiber reinforcing material.

18. The structure of claim 17, wherein the glass fiber reinforcing material comprises an E-glass.

19. The structure of claim 1, wherein the stiffeners include a fibrous reinforcing material and a matrix.

20. The structure of claim 18, wherein the matrix is formed of a polyester, a vinyl ester, an epoxy, a thermosetting resin, or a thermoplastic resin.

21. The structure of claim 1, wherein the stiffeners include a glass fiber reinforcing material and an epoxy matrix material.

22. The structure of claim 1, wherein the stiffeners include a unidirectional fiber reinforcing material.

23. The structure off claim 1, wherein the stiffeners comprise pultruded rods.

24. The structure of claim 1, wherein the stiffeners comprise a plurality of reinforcing rods arranged from one end of the tube to another end of the tube.

25. The structure of claim 1, wherein the stiffeners comprise a plurality of reinforcing rods extending unidirectionally from one end of the tube to another end of the tube.

26. The structure of claim 1, wherein the plurality of stiffeners comprises approximately 72 stiffeners.

27. The structure of claim 1, wherein the plurality of stiffeners comprises between 6 and 12 stiffeners.

28. The structure of claim 1, wherein the hollow tube is able to deflect no more than 3.0 inches at a tip when subjected to a transverse force at the tip of 300 lbs.

29. The structure of claim 1, wherein the hollow tube comprises a stanchion.

30. The structure of claim 1, further comprising a deck mount disposed at one end of the hollow tube configured to mount the hollow tube to a supporting deck, and a plug disposed at another end of the hollow tube configured to close the other end.

31. The structure of claim 1, wherein the tube is approximately 40 inches long, has an inner diameter of approximately 3 inches, and an outer diameter of approximately 3.5 inches.

* * * * *

UNITED STATES PATENT AND TRADEMARK OFFICE
CERTIFICATE OF CORRECTION

PATENT NO. : 6,730,382 B2  
DATED : May 4, 2004  
INVENTOR(S) : Jerome P. Fanucci et al.

It is certified that error appears in the above-identified patent and that said Letters Patent is hereby corrected as shown below:

<u>Column 8,</u>  
Line 1, "The he" should read -- The --;  
Line 16, "submitted-chat" should read -- submitted that --;

<u>Column 9,</u>  
Line 17, "18" should read -- 19 --; and  
Line 25, "off" should read -- of --.

Signed and Sealed this

Twenty-first Day of June, 2005

JON W. DUDAS  
*Director of the United States Patent and Trademark Office*